United States Patent [19]

Kollar

[11] 3,884,965

[45] May 20, 1975

[54] VICINAL GLYCOL ESTER PURIFICATION PROCESS

[75] Inventor: John Kollar, Wyckoff, N.J.

[73] Assignee: Halcon International, Inc., New York, N.Y.

[22] Filed: Apr. 30, 1973

[21] Appl. No.: 355,843

Related U.S. Application Data

[63] Continuation-in-part of Ser. No. 220,889, Jan. 26, 1972, abandoned.

[52] U.S. Cl. .......... 260/499; 260/497 A; 260/497 R
[51] Int. Cl. ............................................. C07c 67/06
[58] Field of Search ..... 260/499, 491, 497 A, 497 R

[56] References Cited
UNITED STATES PATENTS

| | | | |
|---|---|---|---|
| 1,233,333 | 7/1917 | Essex et al. | 260/499 |
| 3,530,043 | 9/1970 | Horn et al. | 260/499 |
| 3,530,044 | 9/1970 | Horn | 260/499 |
| 3,530,044 | 9/1970 | Horn | 203/7 |

FOREIGN PATENTS OR APPLICATIONS

| | | | |
|---|---|---|---|
| 1,064,491 | 4/1967 | United Kingdom | 260/497 A |

*Primary Examiner*—Vivian Garner
*Attorney, Agent, or Firm*—William C. Long; David Dick; Riggs T. Stewart

[57] ABSTRACT

Esters of $C_2$–$C_3$ vicinal glycols with $C_1$–$C_5$ hydrocarbon carboxylic acids are at least partially freed from organic halogen compound impurities by introducing the impurity-containing glycol esters into contact with compounds of selected metals, the ratio of total equivalents of metal to total equivalents of halogen during such contact being in excess of 1:1. Following such contact, the vicinal glycol ester possesses a reduced concentration of organo-halogen compound impurities and can readily be separated from inorganic halogen residues.

18 Claims, 1 Drawing Figure

VICINAL GLYCOL ESTER PURIFICATION PROCESS

CROSS-REFERENCE TO RELATED APPLICATIONS

This case is a continuation-in-part of U.S. Pat. application Ser. No. 220.889, filed on Jan. 26, 1972, now abandoned.

BACKGROUND OF THE INVENTION

Processes for the production of esters of $C_2$–$C_3$ vicinal glycols (i.e., 1,2-ethanediol commonly called "ethylene glycol" and 1,2-propanediol commonly called "propylene glycol") are of considerable commercial interest. This interest has been enhanced by the recent development of processes facilitating the production of such materials at lower costs than heretofore possible.

These recent developments have essentially involved newly discovered systems for catalyzing the direct production of such esters by the reaction of (a) an olefin such as ethylene or propylene, (b) a carboxylic acid such as acetic acid, and (c) molecular oxygen. For example, Belgian Pat. No. 734,842 employs a conjoint catalyst system involving specific metals (or organic bases) in conjunction with iodine. Other processes such as those of Belgian Pat. Nos. 738,104 and 738,463 employ certain variable valent cations together with chlorine or bromine (or their compounds) as catalysts. Yet other processes employ noble-metal-based systems and alkali metal halides in conjunction with redox systems (see U.S. Pat. No. 3,262,969), and still others are capable of using halides although seemingly the use of halides is not essential (see Japanese patent application Ser. No. 58803/66, published May 25, 1970) ). All these processes, however, result in the production of by-products in addition to the desired vicinal glycol ester products, and these by-products include organo-halogen compounds. Although the bulk of these halogen-containing by-products are readily removed from the desired esters, it is difficult and usually uneconomic to completely separate these impurities from the glycol ester by conventional techniques, such as fractional distillation.

The presence of more than minor amounts of organo-halogen compound impurities in the vicinal glycol ester products can frequently interfere with their utilization. For example, it is knwon that in the case of ethylene glycol diacetate, the presence of more than 100–200 ppm of organo-halogen compounds in this material interferes with its pyrolysis to form vinyl acetate (application Ser. No. 83,221 of Oct. 22, 1970, now abandoned). Where it is desired to hydrolyze such esters to produce ethylene glycol or propylene glycol, the presence of organo-halogen compound impurities unfavorably affects the hydrolysis since the halogen compounds have a tendency to contaminate the glycol and their presence introduces corrosion problems, often necessitating employment of more expensive materials of construction than would otherwise be required.

In sum, the presence of such organo-halogen compound impurities has somewhat impeded utilization of this recently developed technology and has created a need for facile, economically attractive techniques for reducing the level of such impurities in such esters.

Other processes have, to some extent, been faced with similar difficulties although arising in quite different contexts. For example, the oxidation of para-xylene to terephthalic acid in the presence of acetic acid solvent is advantageously catalyzed by a heavy metal in conjoint use with bromine. The effluent from such a process accordingly contains aqueous acetic acid and bromide ion (the water being a by-product of the oxidation reaction). The recovery of the acetic acid solvent for recycle in such a process accordingly involves dehydration of the acetic acid and this is complicated by the presence of the bormide ion, present in the form of volatile HBr. One technique suggested for dealing with this problem (see U.S. Pat. No. 3,084,109) has involved the addition of bases to neutralize the HBr and thereby suppress bromide ion volatility, but such a process relies on the presence of the bromine in ionic form and would not be expected to be applicable to halo-organo compounds where ionic halogen would not normally be present.

SUMMARY OF THE INVENTION

It has now been found that contact of vicinal glycol esters which contain organo-halogen compound impurities with compounds of selected metals significantly reduces the level of organic halogen present in the ester product. Such contact converts organic halogen, at least in part, to inorganic halogen salts. Such salts, being essentially non-volatile and only slightly soluble in glycol esters, are readily removed from the ester by such techniques as filtration, or the glycol esters can be volatilized by simple flash vaporization or fractional distillation, leaving behind the inorganic halide salt.

The process of this invention is preferably carried out in a substantially water-free system. In such a system, the occurrence of the observed reaction is wholly unexpected since it takes place in a medium wherein hydrolysis of the organo-halogen compound is largely precluded by the substantial absence of water.

Two categories of metal compounds are employable in the practice of the process of this invention. The aquobasic compounds of the alkali and alkaline earth metals are the first of these two categories. The metal compounds of the second category are compounds of metals selected from at least one member of the group consisting of zinc, lead, cadmium, tin, mercury, silver, manganese, copper, nickel, cobalt, iron and chromium and these can be used instead of or in addition to the alkali metal or alkaline earth metal aquobases. The nature of anion moiety of the metal compounds of the second category does not appear critical (i.e., the compound need not be in aquobase); oxides, hydroxides, carbonates, bicarbonates are employable. So also are the salts of these metals with the weaker mineral acids other than the hydrohalic acids (e.g., some phosphates, phosphites, borates, sulfites, nitrites, etc.). By weaker mineral acids are meant those having a pK in 0.1N water solution at 25°C. of 3.0 or more.

Salts of the metals of both categories with alkyl monobasic hydrocarbon carboxylic acids having up to 20 carbon atoms, with naphthenic acids of up to 20 carbon atoms, with benzoates, and with lower alkyl-substituted benzoic acids are particularly useful. Since these organic acids are weak acids, their salts with the alkali and alkaline earth metals are, it should be noted, aquobases.

Halide salts of any of the foregoing are not effective in reducing organo-halogen impurities concentration but are essentially inert and would frequently be present as reaction product, impurities or diluents.

DETAILED DESCRIPTION OF THE INVENTION

The terms hereinabove employed and hereinafter used in this specification and in the appended claims have, unless otherwise indicated, the following meanings:

"Vicinal glycol esters" (also referred to as "glycol ester," "ester feed" or simply as "ester" or "feed'")—an ester of a vicinal glycol having 2 or 3 carbon atoms in the glycol moiety (i.e., an ester of 1,2-ethanediol or 1,2-propanediol) and having an acyloxy moiety derived from a 1 to 5 carbon atom aliphatic hydrocarbon monobasic carboxylic acid. The esters contemplated are therefore the formates, acetates, propionates, butyrates, isobutyrates or valerates of ethylene glycol or propylene glycol as well as mixtures of such. The term as herein used encompasses the diester as well as the monoester and also includes mixed esters such as, for example, 2-acetoxy-1-formoxyethane. The presence of free (i.e., not esterified) glycol has no effect on the process of this invention and some quantity thereof (up to about 20% mole basis) can often be present; such free glycol is for convenience included with the scope of the term here defined.

By way of illustration, when dealing with acetic acid esters of ethylene glycol, the vicinal glycol ester feed to the process of this invention consists essentially of ethylene glycol diacetate (i.e., 1,2-diacetoxyethane), ethylene glycol monoacetate and ethylene glycol itself. Similarly, when dealing with the acetates of propylene glycol, the glycol feed to the process of this invention includes propylene glycol diacetate (1,2-diacetoxypropane), the propylene glycol monoester (both 1-acetoxypropan-2-ol and 2-acetoxypropan-1-ol) and 1,2-propylene glycol itself.

"Organo-halogen compound impurities" or, more simply, "impurities"—halogen-containing organic compounds predominating in (meaning that more than 50 mole % of the total organic halogen in the ester is present as) one or more compounds of the group consisting of:

and wherein:

X is chlorine, bromine or iodine;

Q is a radical selected from the group consisting of chlorine, bromine, iodine, hydroxy and $C_1$–$C_5$ alkanoyloxy (i.e., where R is hydrogen or $C_1$–$C_4$ alkyl); and, $R_1$ through $R_6$ inclusive are independently selected from the group consisting of hydrogen and methyl with the total number of carbon atoms of $R_1$ plus $R_2$ being either zero or one, the total number of carbon atoms of $R_3$ through $R_6$ inclusive being an integer from zero to two (i.e., zero, one or two), $R_3$ and $R_4$ not both being methyl and $R_5$ and $R_6$ not both being methyl.

Generally, more than 70 mole % of the organic halogen will be in one or more of the above forms and often as much as 90 mole % or even more of the total organohalogen compound will be present in one or more of the above forms. The precise nature of these impurities and their relative proportions to one another, of course, depend upon the reactants used for production of the ester feed. Their nature will also depend upon the catalyst system employed in the manufacture of the ester feed to this process and particularly upon the nature of the halogen component of the catalyst system used (i.e., whether a chlorine, bromine or iodine catalyst component is employed). For example, when the ester feed is derived from the reaction of ethylene, acetic acid and oxygen and when the system used to catalyze the reaction comprises bromine, the organohalogen compound impurities would include brominated analogues of ethylene glycol and its esters and of diethylene glycol and its esters, including such materials as ethylene dibromide (1,2-dibromoethane), bromohydrin (1-bromoethan-2-ol), bromoethyl acetate (1-acetoxy-2-bromoethane), diethylene glycol dibromide (2,2'-dibromodiethyl ether), 2-bromo-2'-hydroxy-diethyl ether and 2-bromo-2'acetoxy-diethyl ether. In addition, the formate analogues of the acetoxy compounds identified in the preceding sentence would also be present albeit in lesser quantities. The formate moieties would be formed by oxidative attack upon either or both the ethylene or acetic acid reactants causing carbon-carbon scission thereof. When propylene and acetic acid are respectively the olefin and carboxylic acid reactants, the organo-halogen compound impurities would include brominated analogues of propylene glycol and of dipropylene glycol such as 1,2-dibromopropane; 1-bromopropan-2-ol; 2-bromopropan-1-ol; 1-bromo-2-acetoxypropane; 2-bromo-1-acetoxypropane; 1,1'-dibromo di-n-propyl ether; 2,2'-dibromo di-n-propyl ether; 1,2'-dibromo di-n-propyl ether; 1-bromo-1'-acetoxy-diisopropyl ether; 2-bromo-1'-acetoxy-diisopropyl ether; 1-acetoxy-isopropyl-2-bromo-n-propyl ether among others. When dealing with mixed ethylene and propylene olefin reactants and again using acetic acid as illustrative, mixtures of all of the foregoing will be present, together with corresponding analogues of ethyl propyl ether such as, typically, 2-bromoethyl-1-bromopropyl ether. When higher homologues of acetic acid such as butyric acid are used as reactants in preparation of the ester feed, the halogenated impurities would include not only the carboxylate esters corresponding to the higher acid (e.g., the butyrates) but would also include lower homologues of such carboxylates, again resulting from carbon-carbon scission, including the acetate and formate.

With different catalyst systems such as, for example, one comprising chlorine in conjunction with a noble metal or a variable valent cation (such as those disclosed in Belgian Pat. Nos. 738,104 and 738,463), the chlorine analogues of any one or more of the foregoing would be the organo-halogen compound impurities encountered and, similarly, when iodine is the halogen employed, the corresponding organo-iodine compounds would be encountered. Of the foregoing (again referring, the convenience, to ethylene, acetic acid and bromine for convenience), those most likely to be prevalent in the organo-halogen compound impurity component of the feed to the process of this invention are bromoethyl acetate and diethylene glycol dibromide (i.e., 1-acetoxy-2-bromoethane and 2,2'-dibromodiethyl ether respectively).

"Aquobase"—see Grant, *Hackh's Chemical Dictionary*, 4th ed., McGraw-Hill (1969) at page 80 —A compound which upon dissolution in water yields hydroxyl ions. In the context of this invention, an aquobase is further defined as a material which displays a pH of at least 8.0 at 25°C. in either a saturated solution or a 0.1 normal solution, whichever of the two is more dilute.

The ester feed to the process of this invention is one which consists essentially of the vicinal glycol ester (as hereinabove defined), and which contains organo-halogen compound impurities. It is also preferably, but not essentially, substantially water-free. The phraseology "substantially water-free" does not mean that the feed is totally anhydrous, since complete separation of water from such ester feeds can often be difficult and of the process of this invention is generally uneconomic and, practically speaking, has been found quite difficult to attain. However, halogen in the feed to the process of this invention is converted to metal salts of relatively low value. In each case, therefore, the impurity level in the feed involves an economic balance between cost or prior distillation and value of halogen converted to salt. Such considerations normally dictate feeds containing under 1 wt. % of organic halogen in the ester feed, generally less than 0.5 wt. % and usually under 0.1 wt. %, all percentages referring to contained organic halogen, based on total ester feed. Most commonly, but not essentially, the ester feed to the process of this invention will contain under 1,000 ppm (weight basis) of water and 100 to 500 ppm (weight basis) of organic halogen, both based on ester feed.

As hereinabove indicated, reduction in the organo-halogen content of the ester feed is accomplished by introducing the ester feed into contact with one or more metal compounds under conditions promoting reaction between the organo-halogen compounds and the metal compounds, thereby converting, at least in part, the organic halogen to inorganic metal halide salts. Some reactions which can occur are illustrated by the following chemical equations (using bromoethyl acetate as an illustrative impurity and potassium compounds as illustrative of the metal compound):

the presence of water does not interfere with process operability, even though essentially anhydrous feeds (i.e., those containing under 500 ppm by wt. of water) are readily operable and are preferred. Accordingly, feeds containing up to about 15 wt. % of water can be employed, although feeds containing less than 5 wt. % water are desired and those containing under 1 wt. % water are preferred.

Similarly, the organo-halogen impurity content of the ester feed can vary over a quite wide range since the limiting factor on the impurity level in the feed is essentially an economic one. Complete removal of impurities from the ester feed by distillation prior to practice In the event that any significant quantity of free water or free carboxylic acid were present in the system, the organic product of the reaction illustrated by equation (3) would undergo further reaction to give ethylene glycol mono- or di-acetate plus potassium acetate plus carbon dioxide. It is noteworthy that, as illustrated by the foregoing equations, the organo-halogen compounds converted by the process of this invention do not represent yield losses since the organic products of the foregoing reactions are themselves valuable esters or ester precursors.

The process of this invention is carried out in homogeneous liquid phase systems or in heterogeneous liquid-solid phase systems. The solid phase, where present, comprises the metal compound, the metal halide reaction product together with materials, organic and inorganic, occluded with the solid phase. It is also possible to carry out the process of this invention by passing a vaporized ester feed over a solid bed of metal compound which requires relatively low pressures and/or high temperatures to vaporize the ester feed. Operation with liquid phase ester feeds is preferred.

The metal compounds employed in the process of this invention are the aquobasic compounds of the alkali and alkaline earth metals such as, for example, the aquobasic compounds of lithium, sodium, potassium, magnesium, calcium, strontium and barium. These materials are employed typically, although not essentially, in the form of their oxides, hydroxides or as salts of relatively weak acids such as in the form of their carbonates, bicarbonates, borates, phosphates (e.g., trisodium phosphates) or as carboxylate salts of $C_1$–$C_{20}$ alkyl monobasic hydrocarbyl carboxylic acids, with naphthenic acids (see *Condensed Chemical Dictionary*, 6th ed., Reinhold (1961) at page 778) of up to 20 carbon atoms, hydrocarbyl aromatic carboxylic acids (preferably monophenyl such as the benzoate and lower alkyl-substituted benzoates such as the toluates, etc.). The use of carboxylate salts, supplied as such or formed in situ by interaction with alkanoyloxy moieties of the ester feed, is generally preferred. The use of organic aquobasic compounds of the alkali or alkaline earth metals other than the carboxylate salts is possible but not preferred.

In addition to or in place of the aquobasic compounds of the alkali and alkaline earth metals, compounds of one or more of zinc, lead, cadmium, tin, mercury, silver, manganese, copper, nickel, cobalt, iron and chromium can also be used. As to these specifically enumerated metals, the anion moiety thereof is not critical so long as the anion is not a halogen. Thus, any one or more of the forms mentioned in connection with the alkali and alkaline earth metals can be employed in addition to salts of the weaker mineral acids as previously defined.

It is normally desired to employ aquobasic alkali or alkaline earth metal compounds since these materials tend to be more readily available at lower cost. Again, cost and availability considerations normally dictate the employment of the more common of the alkali and alkaline earth metal compounds, namely, sodium, potassium, calcium and magnesium compounds, especially the aquobasic compounds of sodium and potassium.

The use of aquobasic potassium compounds gives particularly outstanding results, and for this reason such usage is especially preferred. That potassium should be so superior to other of the compounds desirably employed, and especially to the aquobasic sodium compounds, is surprising and hardly to have been expected since sodium and potassium are normally equivalent materials in most respects. Yet it has been found that potassium compounds are readily capable of producing ester products containing 1 ppm or less of organo-halogen compound impurities; while with aquobasic sodium compounds, it is often difficult to produce ester products containing less than 10 ppm (weight basis) of organo-halogen compound impurities except with quite long contact times. No ready explanation for the superiority of aquobasic potassium compounds to the other materials employable within the scope of this invention can be offered because the reason for potassium's superiority is unknown.

As is obvious, mixtures of metal compounds can be employed. In this context, "mixtures" refers both to mixtures of compounds having different metallic cations with identical anions as well as mixtures of compounds having the same metallic cations with different anions as well as those where both anions and cations differ. Similarly, the metal compounds or mixture of metal compounds need not be especially pure and can be employed in any of the conventionally available purities and/or grades.

The process of this invention is carried out by admixing the metal compound and the ester feed, maintaining them in contact for a period of time sufficient to cause interaction between the metal compound and at least a portion of the organo-halogen impurities in the ester feed and then separating the ester feed from metal halide salts formed. The contacting can be accomplished over relatively broad temperature ranges. When the ester feed is in the liquid phase, appreciable reduction in organo-halogen compound impurity level are encountered at temperatures as low as about 50°C., but more desirably at temperatures of approximately 100°C. or above. It is preferred to employ temperatures of at least about 130°C. Upper limits on temperature, however, are not dictated by the usual process consideration but involve such factors as minimization of thermal degradation of the ester feed. Accordingly, temperatures in excess of 400°C. would seldom be used in the contacting of the ester feed with the metal compound. It is seldom desirable to exceed temperatures of 300°C. and it is preferred not to exceed 250°C. Accordingly, while it is entirely feasible to carry out the process of this invention at temperatures within the range between about 50°C. and about 400°C., it is desired to carry it out at temperatures between about 100°C. and about 300°C. and it is preferred to carry out the process of this invention at temperatures from about 130°C. to about 250°C.

With a vapor phase ester feed, temperatures above about 180°C. would normally be used and it is usually desired to employ temperatures above about 200°C. Temperatures of 250°C. or higher are preferred. The same factors involved in limiting maximum temperature in liquid phase operation are also involved in limiting maximum temperature in vapor phase operation, but different temperature limits are involved. Generally temperature ought not to exceed 500°C. while it is desired not to exceed 450°C. and it is preferred not to exceed 400°C. Thus, when the ester feed is in the vapor phase, temperatures of about 180°C. to about 500°C. can be used but it is desired to operate between about 200°C. and about 400°C. and it is preferred to employ temperatures between about 250°C. and about 400°C.

The period of time during which the ester feed and the metal compound are permitted to remain in contact influences to some extent the amount of organo-halogen compound that will be converted to metal halide salt. In liquid phase operation, significant conversion is achieved with periods of time of even as little as one minute. Greater contact times promote increased conversion of organo-halogen compound, and when the ester feed is in the liquid phase, it is accordingly desired to operate with contact times of at least 3 minutes and it is preferred to operate with contact times of at least 5 minutes. With a vapor phase ester feed, minimum contact times of at least 0.1 second, desirably at least 0.5 second and preferably at least 1.0 second are employed.

There is no process-dictated upper limit on contact time. The only factor of significance in assessing such maxima relates to the economics involved in providing equipment capable of providing long contact times. Accordingly, contact times in the hundreds of hours are entirely suitable for the practice of this invention, independent of the phase of the ester feed. However, economic considerations normally would indicate employment of shorter contact times.

For liquid phase ester feeds, it would seldom be economic to provide for contact times in excess of 50 hours. More often, yet shorter contact times would be preferable, with contact times of the order of 10 hours or less being desired and contact times of 5 hours or less being preferred. Accordingly, a balance of economic and process considerations for liquid phase ester feeds would normally indicate the use of contact times between about one minute and 20–30 hours, more desirably between 5 minutes and about 10 hours and preferably between about 10 minutes and about 3 hours.

For vapor phase ester feeds, it would seldom be economic to provide for contact times in excess of 10 minutes and, more often, yet shorter contact times would be preferable. Contact times of 5 minutes or less would be desirable, while contact times of 1 minute or less would usually be even more economically attractive and hence preferred. Balancing these economic and process factors for vapor phase ester feeds would normally indicate use of contact times between at least 0.1 second and about 10 minutes, desirably between about 0.5 second and 5 minutes and preferably between about 1 second and 1 minute.

As used herein, contact time in a batch system is essentially self-explanatory and is the totality of the period during which the metal compound and the ester feed are maintained in contact with each other. In continuous operation, contact time (in hours or fractions thereof) is defined as the volume of the vessel (or vessels) wherein the contact takes place divided by the total volume of organic material fed to the reactor (measured at actual conditions) per hour.

As hereinabove indicated, neither temperature nor contact time is of particular criticality to the process of this invention. On the other hand, the amounts of impurities in the ester feed relative to the amount of metal compound employed are critical insofar as minima are concerned. It has been found essential that the amount and nature of the metal compounds employed must be such as to provide, during the contacting, a ratio of equivalents of metal cation to equivalents of total halogen (both inorganic and organic) which is in excess of 1:1 preferably at least 1.1:1. The higher this ratio is, the more extensive will be the degree of conversion of organo-halogen compound impurities to inorganic halide salts and the faster will be the rate of reaction, at least initially, other reaction conditions being the same. Accordingly, it is desired to employ ratios which are at least 2:1 and which are preferably at least 4:1. There is, however, no process limit on the upper level of this ratio and, dependent upon economics and the type of equipment employed, it is both feasible and often desirable to employ systems which give ratios of 10,000:1 or even more. Indeed, readily practiced embodiments of this invention (involving vapor phase ester feeds, or liquid phase ester feeds in conjunction with pipeline reactors) would frequently involve employment of ratios which exceed 100:1 and which would often exceed 500:1.

Control of this ratio in batch operation is readily carried out by adjustment of the relative amounts of metal compound employed in relation to total halogen in the feed. Similar techniques are employed to control this ratio in continuous operation. But in continuous operation with liquid phase ester feeds, metal halide reaction product would generally be recycled in part to the zone wherein the contacting occurs, and the halogen content of this recycled metal halide salt reaction product must be taken into account in determining the ratio which, as hereinabove indicated, is based upon total halogen, not merely upon organo-halogen.

With vapor phase ester feeds, all that is necessary is to provide enough metal compound initially so that the ratio of equivalents of metal to equivalents of total halogen would remain sufficiently above 1:1 to ensure that there need be no addition of metal compound until a predetermined time had elapsed. At the end of that period, introduction of ester feed would be temporarily discontinued until additional metal compound could be provided and metal halide by-product could be removed.

By operating in the manner described above, significant reductions in impurities level in the ester feed are obtained. The extent of reduction (expressed as equivalents of halogen present as organic compounds in the ester feed prior to treatment minus the equivalents of halogen present as organics in the product from treatment, the difference being divided by the total equivalents of such halogen in the ester feed) is hereinafter referred to as "conversion." Under preferred conditions outlined above, it is readily possible to obtain conversions exceeding 50% and often possible to obtain conversions exceeding 70%. With liquid phase ester feeds, when operating with ratios of metal compound to total halogen in excess of 4:1, at temperatures exceeding 130°C. and for contact times in excess of 5 minutes, conversions of the order of 70 to 90% or even higher are commonly obtained.

THE DRAWING

The annexed drawing schematically depicts apparatus for the conduct of the process of this invention and is presented to further illustrate and describe the manner of conducting this process. For ease and simplicity in the following discussion, but without intending thereby to imply any limitation upon the scope of this invention, operation with liquid phase ester feeds is presupposed. Also, the arrangement of the schematically depicted apparatus and the following description thereof presuppose continuous operation of the process of this invention and further presuppose that the totality of the ester feed is treated in accordance therewith, although this invention is not so limited. For example, particularly in large-scale commercial operation, it is readily possible to treat only a portion of the ester feed under rigorous conditions to maximize conversion while by-passing an untreated portion of the ester feed. Upon blending the treated and untreated portions, one can often obtain an ester containing a sufficiently lowered impurities level for the desired use.

Figure 1:
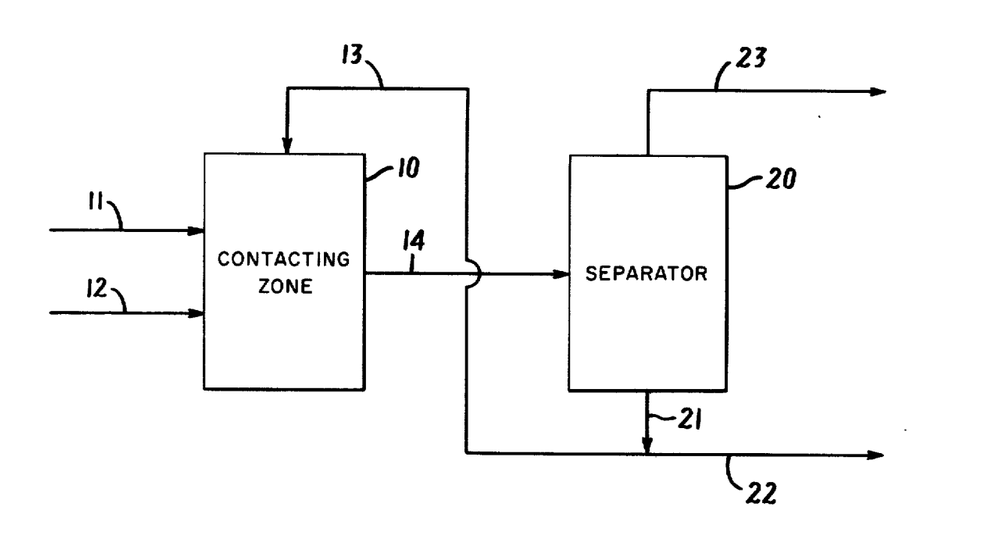

To a contacting zone 10 is introduced an ester feed via conduit 11. Also introduced to the contacting zone via conduit 12 is a metal compound. A recycle stream, obtained as hereinafter described, is introduced to contacting zone 10 via conduit 13. Within contacting zone 10 the metal compound and ester feed are maintained in contact with each other for the desired time (readily controlled by adjustment of feed rates) and then the admixture is withdrawn from contacting zone 10 via conduit 14 whence the admixture is fed to separation zone 20.

The configuration of contacting zone 10 is not critical to the conduct of the process of this invention. Thus, it can be in the form simply of a large tank providing the requisite retention time or it can be equipped with one or more agitators to promote uniformity of mixing. Where the metal compound is completely miscible so that the reaction becomes homogeneous rather than heterogeneous, it can be advantageous for contacting zone 10 to be in the form of a packed column employing any of the conventional packings (e.g., rings, saddles, etc.). Advantageously, contacting zone 10 is so arranged as to minimize the degree of backmixing which occurs therein since in a fully backmixed system, partially untreated ester feed can readily by-pass contact with the metal compound and undergo little or no treatment. Techniques for avoiding backmixing are of course well known to those skilled in the art and include use of internal baffles (not shown). Alternatively, contacting zone 10 may be configured to be in a form which inherently minimizes backmixing. For example, it can be in the form of a so-called pipeline reactor, i.e., a long length of pipe or tubing such that the reactor has an extremely large length to diameter ratio with metal compound all being introduced initially or part initially and the balance periodically along the length of the reactor. (Such reactors may, of course, be straight, coiled or consist of a large number of straight pipes interconnected by U-bends.) Contacting zone 10 can be equipped with heating and/or cooling coils (not shown) in order to maintain the desired temperature therewithin, although such is unnecessary since the ester feed can readily be pre-heated or cooled to the desired temperature and the reaction occuring therewithin generally involves a negligible change in heat content in relation to the total heat content of the ester feed/metal compound admixture.

It should be noted that, while contacting zone 10 is depicted in the drawing as a separate item of equipment, in practice it need not necessarily be such. It is readily possible to incorporate contacting zone 10 into, for example, a section of preceding distillation equipment as, for example, an enlarged zone at the bottom of an upstream distillation column whence the ester feed is derived. The ester feed can also be withdrawn as a vapor product from an upstream distillation column and fed to contacting zone 10 which would then contain a packed bed of metal compound, usually though not essentially disposed upon an inert support.

The metal compounds introduced via conduit 12 to the contacting zone are generally solids. Accordingly, it is frequently advantageous to introduce them as slurries or solutions in appropriate media. To avoid introduction of extraneous material, the slurrying agent or solvent would generally be one or more of the principal components of the ester feed, for example 1,2-diacetoxyethane when this is a desired product. Similarly, ethylene glycol itself can be used when ethylene glycol esters are the desired products.

Within separating zone 20 the esters are separated from metal salt reaction product and unconverted metal compound. Where the metal salt and metal compound are of low solubility in the esters, this can readily be accomplished by filtration and/or centrifugation. On the other hand, when the metal salts and unreacted metal compounds are of significant solubility in the ester products, the separation is more advantageously conducted by volatilization (including flash vaporization and fractional distillation) of the esters, leaving behind the essentially non-volatile metal compounds and salts. Volatilization is particularly appropriate when the metal compounds are, for instance, the alkali metal carboxylates (as metal compound) and alkali metal halides (as reaction products).

Assuming for illustrative purposes that the feed to separation zone 20 consists essentially of acetate esters of ethylene glycol, such volatilization can readily be accomplished by flash vaporization at pressures between about 0.1 mm Hg and 5 atm. absolute with temperatures between about 38°C. and about 270°C. As will be appreciated, flash vaporization would leave in the liquid phase appreciable quantities of unvolatilized ethylene glycol acetates and ethylene glycol. This material left in the liquid phase acts as an excellent solubilizing and/or slurrying agent for the metal halide and unreacted metal compound, and this material in the form of a slurry and/or solution is withdrawn from separation zone 20 via conduit 21 and is divided into two portions. The larger portion is recycled to contacting zone 10 via conduit 13, while a small portion thereof is purged from the system via conduit 22 either continuously or intermittently in order to limit build-up of metal halide in the recycle. The volatilized glycol esters are withdrawn from separation zone 20 via conduit 23 and are now possessed of a lowered concentration of organohalogen compound impurity and are suitable for use as such as solvents or plasticizers or they can readily be converted to free glycol by hydrolysis or, especially in the case of ethylene glycol diacetate, can be pyrolyzed to form vinyl acetate.

In order to effect the vaporization described as occurring within separation zone 20, heat must be supplied thereto. This can readily be accomplished by employment of re-boiling facilities within separation zone 20 or by pre-heat of the material flowing through conduit 14. These facilities being conventional, they are not herein shown nor are the obviously necessary pumps or other fluid transfer devices.

EXAMPLES

The following examples are further intended to illustrate this invention without limiting the scope thereof. Unless otherwise indicated, all parts and percents referred to in the following examples are on a molar basis.

A series of oxidation reactions are carried out employing (a) ethylene and propylene as the olefin reactants, (b) acetic acid or butyric acid as the carboxylic acid reactant and (c) molecular oxygen. The effluents from each of these oxidations are processed to remove catalyst and fractionally distilled to recover ester feeds.

Feedstock A. Ethylene, acetic acid and oxygen are reacted for 2 hours at 160°C. in the presence of a tellurium dioxide plus HBr catalyst system in accordance with the teachings of Run 6 of Belgian Pat. No. 738,104. The product so obtained contains 59.4 wt. % ethylene glycol diacetate, 38.5 wt. % of ethylene glycol monoacetate and 2.0 wt. % of unesterified ethylene glycol. This material contains less than 5 ppm by weight of water. In addition, this material contains approximately 245 ppm by weight of halogen in organic forms.

Over 70 mole % of the organo-halogen compounds are in the form of bromoethyl acetate and diethylene glycol dibromide with lesser amounts of bromohydrin and 2-bromo-2'-hydroxy-diethyl ether. Additional organo-bromine compounds are present but in smaller concentrations.

Feedstock B. Ethylene is oxidized under conditions identical to those used in the preparation of feedstock A employing, however, manganese acetate and hydrogen chloride as the catalyst components. (Run 14 of Belgian Pat. No. 738,104). The material thus obtained is found to be essentially identical in composition to that obtained in the preparation of feedstock A except, of course, that the halogenated organic materials present are the chlorinated analogues of the organo-bromine compounds encountered and are present in a concentration of 350 ppm by weight.

In yet another run employing cerium chloride and lithium chloride as catalyst components (Run 8 of Belgian Pat. No. 738,104), the ester feed thus obtained was found to be essentially the same as that obtained using manganese. Hence, both materials are composited to constitute feedstock (B).

Feedstock C. Again, ethylene, acetic acid and oxygen are reacted at 160°C. for 4 hours in the presence of a catalyst containing potassium iodide and iron acetate in accordance with the teachings of Run 12 of Belgian Pat. No. 734,842. After catalyst removal and fractionation, an ethylene glycol ester feed containing 62.1 wt. % of ethylene glycol diacetate, 35.7 wt. % of ethylene glycol monoacetate and 2.1 wt. % of free ethylene glycol is obtained. As in the case of the preceding feedstocks, the ester feed is found to be essentially anhydrous and to contain 135 ppm by weight of halogen in the form of organo-iodine compounds. These compounds predominate in 1-acetoxy-2-iodoethane and 2,2'-diiododiethyl ether but also contain other organo-iodine compounds, including 1,2-diiodoethane.

Feedstock D. Ethylene, oxygen and acetic acid are reacted at a temperature of 104°C. for 10.75 hours in the presence of a catalyst system containing 0.01 mole of palladous chloride, 0.1 mole of lithium chloride, 0.04 mole of lithium acetate and 0.015 mole of cupric acetate per 100 milliliters of acetic acid present within the reactor in accordance with the teachings of Example 1 of U.S. Pat. No. 3,262,969.

The reaction product is treated for removal of residual catalyst and for the removal of acetaldehyde and ethylidene diacetate, leaving an essentially anhydrous pure ethylene glycol diacetate containing approximately 395 ppm by weight of organic chlorine. These organic chlorine compounds include chlorohydrin; chloro-ethyl acetate; 2,2'-dichloro diethyl ether and 2-chloro-2'-hydroxy diethyl ether.

Feedstock E. Propylene is reacted with acetic acid and oxygen at 115°C. for 2 hours in accordance with the teachings of Run 6 of Belgian Pat. No. 738,463. After catalyst recovery and distillation, an ester feed containing 51.6 wt. % of 1,2-diacetoxypropane; 38.3 wt. % of 1-acetoxypropan-2-ol plus 2-acetoxypropan-1-ol and 10.0 wt. % of 1,2-propylene glycol is obtained.

As before, this feedstock is essentially anhydrous and contains approximately 320 ppm by weight of bromine in the form of organo-bromine compounds predominating in 1-bromo-2-acetoxypropane, 2-bromopropan-1-ol and 2-bromo-1-acetoxypropane with lesser amounts of 1,1'-dibromo diisopropyl ether as well as other organo-bromine compounds.

Feedstock F. Propylene, butyric acid and molecular oxygen are reacted at 140°C. for 2 hours in accordance with the procedures of Belgian Pat. No. 738,463 in the presence of $TeO_2$ and HBr. The effluent is treated and distilled as before and a heart-cut consisting essentially of esters of propylene glycol is obtained. This heart-cut contains 49.3 wt. % of 1,2-dibutyroxypropane; 39.2 wt. % of 1-butyroxypropan-2-ol plus 2-butyroxypropan-1-ol; and, 11.4 wt. % of lower carboxylate analogues of these compounds, primarily the acetates and formates. This feedstock is essentially anhydrous and contains 280 ppm by weight of bromine in the form of organo-bromine compounds.

EXAMPLE I

A series of batch runs is conducted at 220°C. for 1 hour. Each run is carried out by admixing the metal compound with the feed and charging the admixture to a 250 cc glass-lined steel autoclave equipped with an agitator. At the end of each run, the autoclave contents are cooled, filtered to remove any solids. The filter cake, if any, is washed with ethylene glycol to remove occluded organics and the filtrate and washings are combined and distilled to dryness to separate organics from soluble metal compounds and/or salts. The organics are then analyzed to determine organic halogen compounds therein. Table I below identifies the metal compound and the conversion obtained in each of the runs. In Runs 1 through 6 inclusive, feedstocks A through F respectively are employed. In the balance of the runs, feedstock A is employed. The ratio of equivalents of metal compounds to equivalents of total halogen (hereafter referred to as "Ratio" for convenience) is 4:1 in each run. The mixture of metal compounds used in Run 12 is equimolar.

TABLE I

| Run No. | Metal Compound | Conversion, % |
|---|---|---|
| 1 | sodium hydroxide | 92.2 |
| 2 | sodium hydroxide | 92.1 |
| 3 | sodium hydroxide | 97.8 |
| 4 | sodium hydroxide | 89.8 |
| 5 | sodium hydroxide | 95.1 |
| 6 | sodium hydroxide | 95.1 |
| 7 | sodium acetate | 90.3 |
| 8 | potassium acetate | 93.1 |
| 9 | calcium carbonate | 88.6 |
| 10 | magnesium oxide | 87.7 |
| 11 | lithium hydroxide | 78.6 |
| 12 | NaOH and NaBr | 79.3 |
| 13 | strontium carbonate | 89.4 |
| 14 | sodium ethoxide | 91.6 |
| 15 | zinc acetate | 93.1 |
| 16 | lead naphthenate | 93.9 |
| 17 | cadmium acetate | 93.6 |
| 18 | tin oxide | 87.0 |
| 19 | mercury (II) oxide | 95.6 |
| 20 | silver nitrate | 97.2 |
| 21 | manganese naphthenate | 91.6 |
| 22 | copper (II) acetate | 83.3 |
| 23 | nickel acetate | 78.7 |
| 24 | cobalt naphthenate | 89.0 |
| 25 | iron (II) oxide | 87.0 |
| 26 | chromium naphthenate | 83.3 |

EXAMPLE II

The procedure of Example I is repeated employing several portions of feedstock A, to each of which is added a small quantity of water. In this manner, feeds containing 100 ppm (weight basis) of water, 0.5 wt. % water and 3.0 wt. % of water are prepared. Sodium acetate is the metal compound employed and is used in an amount sufficient to give a Ratio (as defined in Example I) of 4:1. Conversions in each run are in the range of 85–95%, similar to those observed in Example I. This indicates that the presence of small quantities of water has no effect upon the process of this invention.

EXAMPLE III

A series of runs is carried out employing feedstock A and D under the identical conditions used in Example I, with sodium hydroxide as the metal compound but at varying times and temperatures. Table II below gives the results obtained.

TABLE II

| Run No. | Feedstock | Time, Hrs. | Temperature, °C. | Conversion, % |
|---|---|---|---|---|
| 1 | A | 4.0 | 180 | 73 |
| 2 | A | 0.5 | 230 | 92 |
| 3 | A | 0.1 | 250 | 88 |
| 4 | A | 0.1 | 300 | 97 |
| 5 | D | 8.0 | 180 | 71 |
| 6 | D | 1.0 | 220 | 92 |
| 7 | D | 0.5 | 250 | 98 |
| 8 | D | 0.1 | 300 | 97 |

The lower conversions observed in Runs 1 and 5, as contrasted to those obtained in Runs 2 and 6, indicate that optimum temperatures for conduct of the process of this invention exceed about 180°C. It is observed that the products of Runs 4 and 8 are somewhat darker in color than are the products of the other runs of this example, thus indicating that some degree of product degradation is occurring, albeit to only a small degree.

EXAMPLE IV

Another series of runs similar to those of Example 1 is conducted employing feedstock A, various metal compounds or equimolar mixtures of metal compounds at 210°C. for 1 hour but employing varying Ratios as defined in Example I.

TABLE III

| Run No. | Metal Compounds | Ratios | Conversions |
|---|---|---|---|
| A | sodium acetate | 1.0 | 29 |
| B | sodium bromide | 1.0 | nil |
| C | potassium chloride | 1.0 | nil |
| D | barium chloride | 1.0 | nil |
| E | barium chloride | 2.0 | nil |
| 1 | sodium hydroxide | 2.0 | 82 |
| 2 | sodium hydroxide & sodium acetate | 2.0 | 81 |
| 3 | sodium hydroxide | 6.0 | 91 |
| 4 | sodium hydroxide | 20.0 | 94.3 |
| 5 | sodium hydroxide | 200 | 99.1 |
| 6 | sodium hydroxide | 1000 | 99.5 |
| 7 | sodium hydroxide | 25000 | 99.7 |

The lettered runs of the above table are controls not illustrative of the invention. Control A illustrates the poor results obtained when operating with ratios of precisely 1:1, while Run 1 illustrates that excellent results are obtained with ratios above this minimum. Controls B through E inclusive illustrate the inoperability of halide salts of the alkali and alkaline earth metals for the process of this invention. The numbered runs which are illustrative of this invention indicate that conversion increases as ratio increases above 1:1 but that little improvement in conversion is obtained with ratios in excess of 6:1.

EXAMPLE V

Samples of feedstock A are vaporized and passed continuously through a preheater and then up through a vertical reactor (2 inches O.D., 13 BWG tubing, 12 feet in length) containing a 10 foot long packed bed of 4–10 mesh (U.S. sieve series) activated carbon impregnated with sodium acetate(containing 20 wt. % of sodium acetate). In the following series of runs, feed rate (and hence residence time) is varied by varying heat input to the vaporizer while reactor temperature is controlled by adjusting heat input to the preheater. The effluent from the reactor is passed through a water-cooled condenser which is connected through a dry-ice trap to atmosphere. The condensates are collected and analyzed. The following table sets forth run conditions and the results obtained after steady-state operation is achieved.

TABLE IV

| Run No. | Residence Time, seconds | Temperature, °C. | Conversion, % |
|---|---|---|---|
| 1 | 2.0 | 340 | 87.4 |
| 2 | 1.0 | 360 | 94.2 |
| 3 | 0.2 | 390 | 95.2 |

EXAMPLE VI

An ester feed is prepared by the continuous reaction of ethylene, acetic acid and molecular oxygen at 150°C. and 300 p.s.i.g. in the conjoint presence of tellurium cation and bromine supplied both as HBr and as organo-bromine compounds including 1-acetoxy-2-bromoethane. The oxidation effluent is stripped of excess acetic acid and continuously distilled to obtain 21.95 parts/hr. of a heart-cut of the following composition.

| | |
|---|---|
| ethylene glycol diacetate | 66.7% |
| ethylene glycol monoacetate | 29.3% |
| ethylene glycol | 3.7% |
| high-boiling materials | 0.3% |

The high-boiling materials are non-halogenated di- and tri-ethylene glycols and their esterified analogues having an average molecular weight of 200.

The stream is essentially free of water (below 10 ppm, wt. basis) and contains about 100 ppm (wt. basis) of bromine in the form of organo-bromine compounds. These halogenated impurities consist essentially of about 70% 1-acetoxy-2-bromoethane, about 20% of 2,2'-dibromo-diethyl ether and smaller quantities of bromohydrin and 2-acetoxy-2'-bromo-diethyl ether, among other materials present.

The stream is preheated to 230°C., admixed with 0.17 part/hr. of make-up sodium hydroxide in the form of an admixture with ethylene glycol (85.4% ethylene glycol) and also admixed with 5.28 parts per hour of a 215°C. recycle stream having the following composition and obtained as hereinafter described:

| | |
|---|---|
| ethylene glycol diacetate | 60.5% |
| ethylene glycol monoacetate | 21.8% |
| ethylene glycol | 0.6% |
| sodium acetate | 14.4% |
| sodium bromide | 2.3% |
| high-boiling materials (as described above) | 0.4% | to form a feed totalling 27.40 parts/hr. at a temperature of 225°C. and of the following composition:

| | |
|---|---|
| ethylene glycol diacetate | 65.1% |
| ethylene glycol monoacetate | 27.7% |
| ethylene glycol | 3.5% |
| sodium acetate | 2.8% |
| sodium bromide | 0.5% |
| sodium hydroxide | 0.1% |
| high-boiling materials | 0.3% |

This overall feed contains about 80 ppm (wt. basis) of organic bromine while the overall molar ratio of equivalents of metal (sodium) to total equivalents of halogen (bromine) of about 7.2:1, including the metal and halogen contribution of the metal salt.

This overall feed is introduced into the bottom of a vertical column maintained at 45 p.s.i.a. and divided into three chambers by two internal baffles, arranged to permit flow of liquid upwardly through the column while inhibiting mixing between chambers. The baffles are configured to provide an average contact time in each chamber of 10 minutes and each chamber is provided with an agitator to promote complete mixing within each chamber. The effluent from the column totals 27.39 parts per hour, contains under 5 ppm (wt. basis) of halogen in the form of organic compounds and has the following composition:

| | |
|---|---|
| ethylene glycol diacetate | 63.1% |
| ethylene glycol monoacetate | 31.4% |
| ethylene glycol | 1.8% |
| sodium acetate | 2.9% |
| sodium bromide | 0.5% |
| high-boiling materials | 0.3% |

Conversion obtained is approximately 97%. It should also be noted that during the contacting substantially all of the sodium hydroxide has undergone reaction to form the aquobasic acetate salt of sodium. The amount of ethylene glycol diacetate is slightly reduced and the amount of free ethylene glycol is greatly reduced during the contacting resulting in a substantial increase in the amount of ethylene glycol monoacetate (itself of great value) present.

The effluent is then fed to a vapor-liquid separator maintained at 215°C. and 30 p.s.i.a. wherein the effluent is flashed to volatilize the ester and separate it from the metal compound and halide salt by-product. The necessary heat input for this flashing is provided by reboiler facilities associated with the vapor-liquid separator. In this manner, a vapor product (22.02 parts per hour) and liquid-solid recycle stream (5.31 parts per hour) are obtained. A small portion (0.03 parts per hour) of the recycle stream is purged to avoid excessive build-up of the halide salt, while the balance is the source of the recycle stream admixed with the ester feed. If desired, the organics content of the purge can be recovered, for example, by cooling the purge stream to crystallize out the metal halide. The vaporized ester from the flash has the following composition and contains less than 3 ppm (wt. basis) of organic halogen which is an acceptable level for essentially any purpose.

| | |
|---|---|
| ethylene glycol diacetate | 64.0% |
| ethylene glycol monoacetate | 33.9% |
| ethylene glycol | 2.1% |

EXAMPLE VII

A series of oxidations are carried out using the reactants, catalyst system and reaction conditions described in Examle VI to prepare additional ethylene glycol acetate ester feeds. The crude reaction products are then subjected to distillations for removal of excess acetic acid and to prepare heart-cuts containing less than 10 ppm of water and varying amounts of halogenated impurities. In this manner, Feedstocks G, H and J are prepared containing, on a weight basis, 131 ppm, 82 ppm and 34 ppm of halogenated impurities respectively. In each case, the predominant halogenated organic impurities are 1-acetoxy-2-bromoethane, 2,2'-dibromodiethyl ether, bromohydrin, 2-acetoxy-2'-bromodiethyl ether, together with lesser quantities of other brominated impurities.

Using these feedstocks, a series of runs are carried out by charging 40 grams of feedstock and 0.24 grams of potassium acetate to a glass reactor equipped with a magnetically operated agitator. In addition, in Runs 2–7 inclusive, varying amounts of potassium bromide, the reaction by-product, are also added to simulate conditions that would prevail in recycle operations on a large scale. The reactor is then sealed, heated quickly to 220°C. and maintained at this temperature (within an accuracy of ± 2°C.) for the indicated time, following which the reactor is quickly cooled. The effluent from the reactor is then subjected to a flash distillation to separate the ester product from the inorganic halide salt by-product. The overhead is analyzed to determine the amount of halogen contained in the distilled overhead product. The following table describes the reaction conditions and presents the results obtained.

TABLE V

| Run No. | Feedstock | Aquobase | Potassium Bromide Added, Wt. % | Time, Hrs. | Bromine Content of Overhead product ppm (wt. basis) |
|---|---|---|---|---|---|
| 1 | G | KAc* | nil | 1.0 | <1 |
| 2 | J | KAc | 0.3 | 2.0 | <1 |
| 3 | J | KAc | 0.6 | 2.0 | <1 |
| 4 | J | KAc | 1.2 | 2.0 | 1 |
| 5 | H | KAc | 0.6 | 0.5 | <1 |
| 6 | H | KAc | 0.6 | 1.0 | <1 |
| 7 | G | KAc | 0.6 | 1.5 | <1 |

*Ac = acetate

The data presented in the foregoing table clearly indicate the outstanding results obtained when using aquobasic potassium compounds. The use of potassium gives products containing exceedingly low concentrations of halogenated impurities and does so despite wide variation in reaction time and also irrespective of the amount of diluent present. That the same results are apparently attained both irrespective of time and irrespective of diluent level would appear to suggest that equilibrium considerations are not responsible for the outstanding results obtained when using the potassium species.

The foregoing description illustrates the methods of this invention. It will be understood that modifications and variations may be effected by those skilled in the art without departing from the spirit of this invention. Accordingly, it is intended that all matter contained in the foregoing description shall be interpreted as illustrative and not in a limiting sense.

What is claimed is:

1. A process for purification of $C_1$–$C_5$ hydrocarbon carboxylic acid esters of [$C_2$–$C_3$] vicinal ethylene and propylene glycols containing less than 5 wt. % water, said esters containing organic halogen compound impurities predominating in at least one member of the group consisting of:

and wherein:

X is chlorine, bromine or iodine;

Q is a radical selected from the group consisting of chlorine, bromine, iodine, hydroxy and $C_1$–$C_5$ alkanoyloxy; and, $R_1$ through $R_6$ inclusive are independently selected from the group consisting of hydrogen and methyl with the total number of carbon atoms of $R_1$ plus $R_2$ being either zero or one, the total number of carbon atoms of $R_3$ through $R_6$ inclusive being an integer from zero to two, $R_3$ and $R_4$ not both being methyl and $R_5$ and $R_6$ not both being methyl;

said purification process comprising the steps of:

a. Contacting at a temperature between about 50° C. and about 400°C. said impurity-containing vicinal glycol ester, the ester being in the liquid phase, with at least one metal compound selected from the group consisting of the aquobasic alkali metal compounds, aquobasic alkaline earth metal compounds and compounds other than the halides selected from the group consisting of oxides, hydroxides, carbonates, bicarbonates, salts of mineral acids having a pK in 0.1N water solution at 25°C. of 3.0 or more, salts with alkyl monobasic hydrocarbon carboxylic acids having up to 20 carbon atoms, salts with naphthenic acids of up to 20 carbon atoms, salts with benzoic acid and salts with lower alkyl-substituted benzoic acids of zinc, lead, cadmium, tin, mercury, silver, manganese, copper, nickel, cobalt, iron and chromium, the ratio of total equivalents of metal to total equivalents of halogen during such contact being in excess of 1:1;

b. Maintaining the ester in contact with the metal compound for a time sufficient to permit reaction between the metal compound and the organic halogen compound impurities, the time being in excess of 1 minute; and, c. Separating the vicinal glycol ester, having a reduced quantity of organo-halogen compound impurity, from metal compounds.

2. A process in accordance with claim 1 wherein the temperature is in excess of 130°C. and the time is at least 3 minutes.

3. A process in accordance with claim 1 wherein the temperature is within the range of 130°–250°C. and the time is within the range of from at least 10 minutes to about 3 hours.

4. A process in accordance with claim 1 wherein the ester is an ethylene glycol ester of acetic acid.

5. A process in accordance with claim 3 wherein the ester is an ethylene glycol ester of acetic acid.

6. A process in accordance with claim 1 wherein the ester is a propylene glycol ester of acetic acid.

7. A process in accordance with claim 1 wherein the metal compound is a potassium compound.

8. A process in accordance with claim 1 wherein the metal compound is an alkali or alkaline earth metal compound.

9. A process in accordance with claim 8 wherein the metal compound is in the form of a carboxylate salt of an alkali or alkaline earth metal.

10. A process in accordance with claim 9 wherein the metal compound is in the form of a potassium carboxylate salt.

11. A process in accordance with claim 1 wherein the metal compound is a sodium or potassium carboxylate salt.

12. A process for purification of $C_1$–$C_5$ hydrocarbon carboxylic acid esters of vicinal ethylene and propylene glycols containing less than 5 wt. % water, said esters containing organic halogen compound impurities predominating in at least one member of the group consisting of:

and wherein:

X is chlorine, bromine or iodine;

Q is a radical selected from the group consisting of chlorine, bromine, iodine, hydroxy and $C_1$–$C_5$ alkanoyloxy; and $R_1$ through $R_6$ inclusive are independently selected from the group consisting of hydrogen and methyl with the total number of carbon atoms of $R_1$ plus $R_2$ being either zero or one, the total number of carbon atoms of $R_3$ through $R_6$ inclusive being an integer from zero to two, $R_3$ and $R_4$ not both being methyl and $R_5$ and $R_6$ not both being methyl;

said purification process comprising the steps of:

a. Contacting at a temperature of about 180°C. to about 500°C. said impurity-containing vicinal glycol ester, the ester being in the vapor phase, with at least one metal compound selected from the group consisting of the aquobasic alkali metal compounds, aquobasic alkaline earth metal compounds and compounds other than the haldies selected from the group consisting of oxides, hydroxides, carbonates, bicarbonates, salts of mineral acids having a pK in 0.1N water solution at 25°C. of 3.0 or more, salts with alkyl monobasic hydrocarbon carboxylic acids having up to 20 carbon atoms, salts with naphthenic acids of up to 20 carbon atoms, salts with benzoic acid and salts with lower alkyl-substituted benzoic acids of zinc, lead, cadmium, tin, mercury, silver, manganese, copper, nickel, cobalt, iron and chromium, the ratio of total equivalents of metal to total equivalents of halogen during such contact being in excess of 1:1;

b. Maintaining the ester in contact with the metal compound for a time sufficient to permit reaction between the metal compound and the organic halogen compound impurities, the time being at least 0.1 second; and, c. Separating the vicinal glycol ester, having a reduced quantity of organo-halogen compound impurity, from metal compounds.

13. A process in accordance with claim 12 wherein the temperature iis in excess of 200°C. and the time recited in step (b) thereof is at least 0.5 second.

14. A process in accordance with claim 12 wherein the temperature is within the range between about 250°C. and about 400°C. and the contact time recited in step (b) thereof is between about 1 second and 1 minute.

15. A process in accordance with claim 12 wherein the metal compound is an alkali or alkaline earth metal compound.

16. A process in accordance with claim 15 wherein the metal compound is in the form of a carboxylate salt of an alkali or alkaline earth metal.

17. A process in accordance with claim 12 wherein the metal compound is a sodium or potassium carboxylate salt.

18. A process in accordance with claim 17 wherein the metal is potassium.

* * * * *